United States Patent
Ling

[11] Patent Number: 6,053,017
[45] Date of Patent: Apr. 25, 2000

[54] COMBINATION LOCK MEANS FOR FLOPPY DISK DRIVE

[76] Inventor: Chong-Kuan Ling, 11F, No. 27, An-Ho Road, Sec. 1, Taipei, Taiwan, 106

[21] Appl. No.: 09/352,805

[22] Filed: Jul. 13, 1999

[51] Int. Cl.[7] .................................................. E05B 69/00
[52] U.S. Cl. ..................................... 70/58; 70/14; 70/312
[58] Field of Search .................................. 70/14, 57, 58, 70/312

[56] References Cited

U.S. PATENT DOCUMENTS

| | | | |
|---|---|---|---|
| 4,794,587 | 12/1988 | Cordiano | 70/58 X |
| 4,907,111 | 3/1990 | Derman | 70/58 X |
| 4,991,416 | 2/1991 | Resendez, Jr. et al. | 70/312 |
| 5,136,862 | 8/1992 | Langen | 70/58 X |
| 5,156,027 | 10/1992 | Reusch | 70/58 X |
| 5,255,154 | 10/1993 | Hosoi et al. | 70/312 X |
| 5,268,809 | 12/1993 | Eschenburg | 70/58 X |
| 5,305,621 | 4/1994 | Broadwater | 70/58 X |
| 5,355,272 | 10/1994 | Kung | 70/58 X |
| 5,361,610 | 11/1994 | Sanders | 70/58 X |
| 5,400,622 | 3/1995 | Harmon | 70/58 X |
| 5,446,618 | 8/1995 | Tetsuya et al. | 70/58 X |
| 5,608,605 | 3/1997 | Siow et al. | 70/58 X |
| 5,630,330 | 5/1997 | Kung | 70/58 |
| 5,673,573 | 10/1997 | Green | 70/58 X |
| 5,719,731 | 2/1998 | Harmon | 70/58 X |
| 5,757,616 | 5/1998 | May et al. | 70/58 X |
| 5,868,012 | 2/1999 | Chun-Te et al. | 70/312 X |

FOREIGN PATENT DOCUMENTS

| | | | |
|---|---|---|---|
| 384164 | 8/1990 | European Pat. Off. | 70/58 |
| 2240423 | 7/1991 | United Kingdom | 70/58 |

*Primary Examiner*—Suzanne Dino Barrett

[57] ABSTRACT

A combination lock device for floppy disk drive includes: a resembling disk member corresponding to a dimension of a floppy disk insertable in a disk drive of a personal computer having a casing formed at a front (or proximal) end of the disk member; and a combination locking device having a plurality of combination dials rotatably mounted in the casing of the disk member and operatively controlling a locking bar movably lockable or unlockable within the disk drive for locking the disk member within the disk drive when locked for preventing unauthorized intrusion in the disk drive of the personal computer or for unlocking and withdrawal of the disk member from the disk drive when unlocked.

6 Claims, 7 Drawing Sheets

COMBINATION LOCK MEANS FOR FLOPPY DISK DRIVE

BACKGROUND OF THE INVENTION

U.S. Pat. No. 5,719,731 entitled "Locking Device for Preventing Unauthorized Access to Floppy Disk Drives of Personal Computers" to Thomas J. Harmon disclosed a locking device inserted within the disk drive of a personal computer including a pair of pivoted plates retained in their expanded locking position by a key-operated lock carried by the pivoted plates. For unlocking the floppy disk drive as locked by such a conventional locking device, a key should be carried and provided for unlocking use, causing inconvenience for the user since the key may be lost or forgotten to carry.

The present inventor has found the drawback of the conventional locking device for disk drive and invented the present combination lock means for floppy disk drive.

SUMMARY OF THE INVENTION

The object of the present invention is to provide a combination lock device for floppy disk drive including: a resembling disk member corresponding to a dimension of a floppy disk insertable in a disk drive of a personal computer having a casing formed at a front (or proximal) end of the disk member; and a combination locking device having a plurality of combination dials rotatably mounted in the casing of the disk member and operatively controlling a locking bar movably lockable or unlockable within the disk drive for locking the disk member within the disk drive when locked for preventing unauthorized intrusion in the disk drive of the personal computer or for unlocking and withdrawal of the disk member from the disk drive when unlocked.

DETAILED DESCRIPTION

Figure 1:
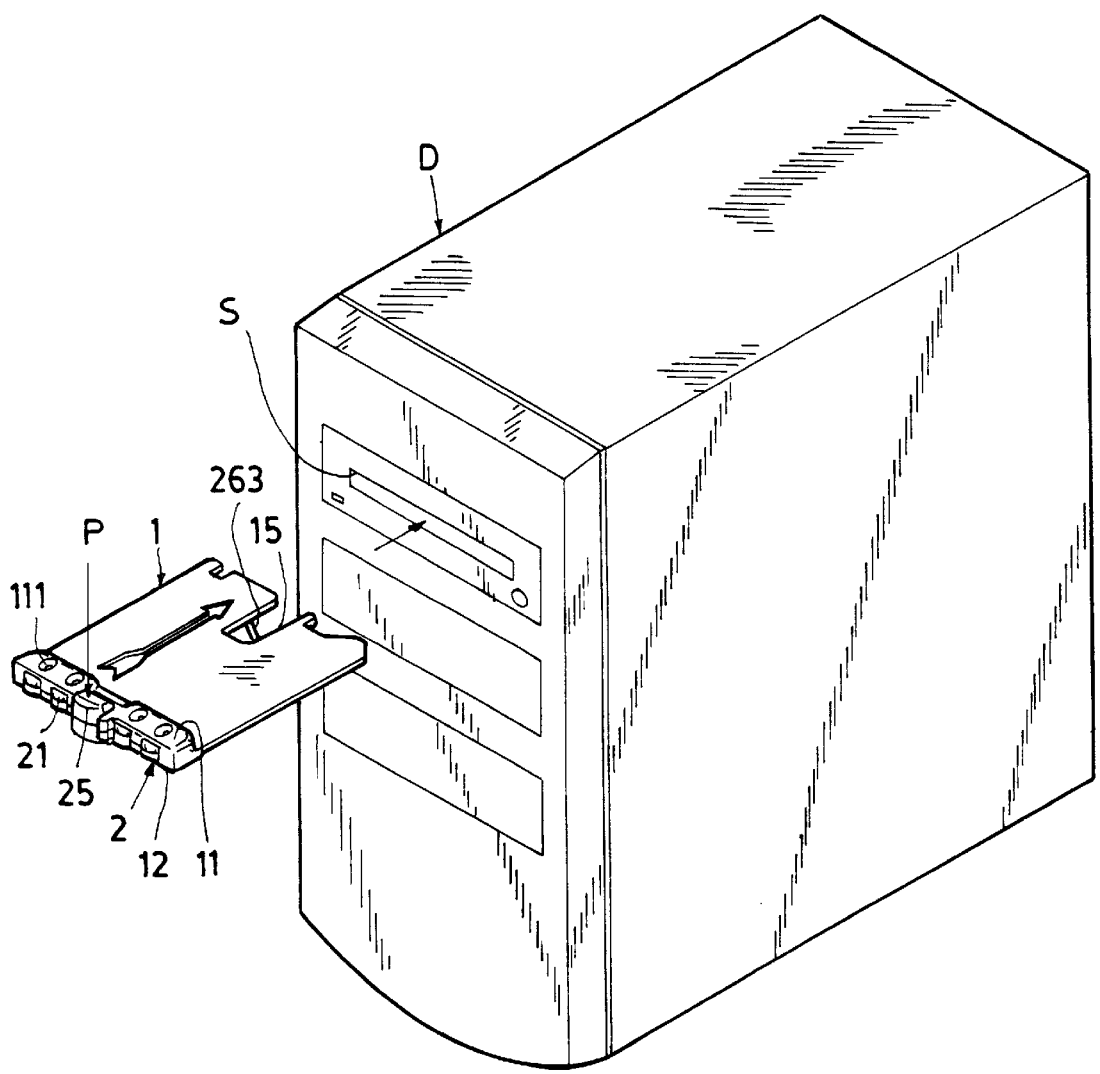
FIG. 1 is an illustration showing an insertion of the present invention into a disk drive.

As shown in the drawing figures, the present invention comprises: a resembling disk member 1 having a dimension generally equivalent or corresponding to a dimension of a conventional floppy disk insertable in an insert opening S of a disk drive D of a personal computer; a combination locking device 2 formed on the disk member 1 for locking or unlocking the disk member 1 in or from the disk drive D; and a combination-changing means 3 provided on the disk member 1 for resetting or changing a combination of the combination locking device 2.

The resembling disk member 1 includes: a casing 11 formed on a front (or proximal) end portion of the disk member 1 which is formed as a flat plate defining an upper planar surface and a bottom planar surface H of the disk member, a bottom cover 12 formed on a bottom of the casing 11, a plurality of stems 13 respectively formed in the casing 11 for rotatably mounting the dials 21 of the combination locking device 2 on the stems 13, an elongate pivoting groove 14 longitudinally formed in the disk member for pivoting the locking bar 26 within the groove 14 as covered by the bottom cover 12, a rear slot 15 formed in a rear (or distal) end portion of the disk member 1, and a guiding groove 16 recessed in the disk member 1 for movably mounting the combination-changing means 3 therein.

The casing 11 has a height larger than the height of the opening S of the disk drive D to serve as a "stopper" beyond the opening S when inwardly inserting the disk member 1 into the disk drive D.

The resembling disk member 1 defines a longitudinal axis X at a longitudinal center of the disk member 1, with the guiding groove 16 generally parallel to the longitudinal axis X of the disk member 1.

Figure 5:
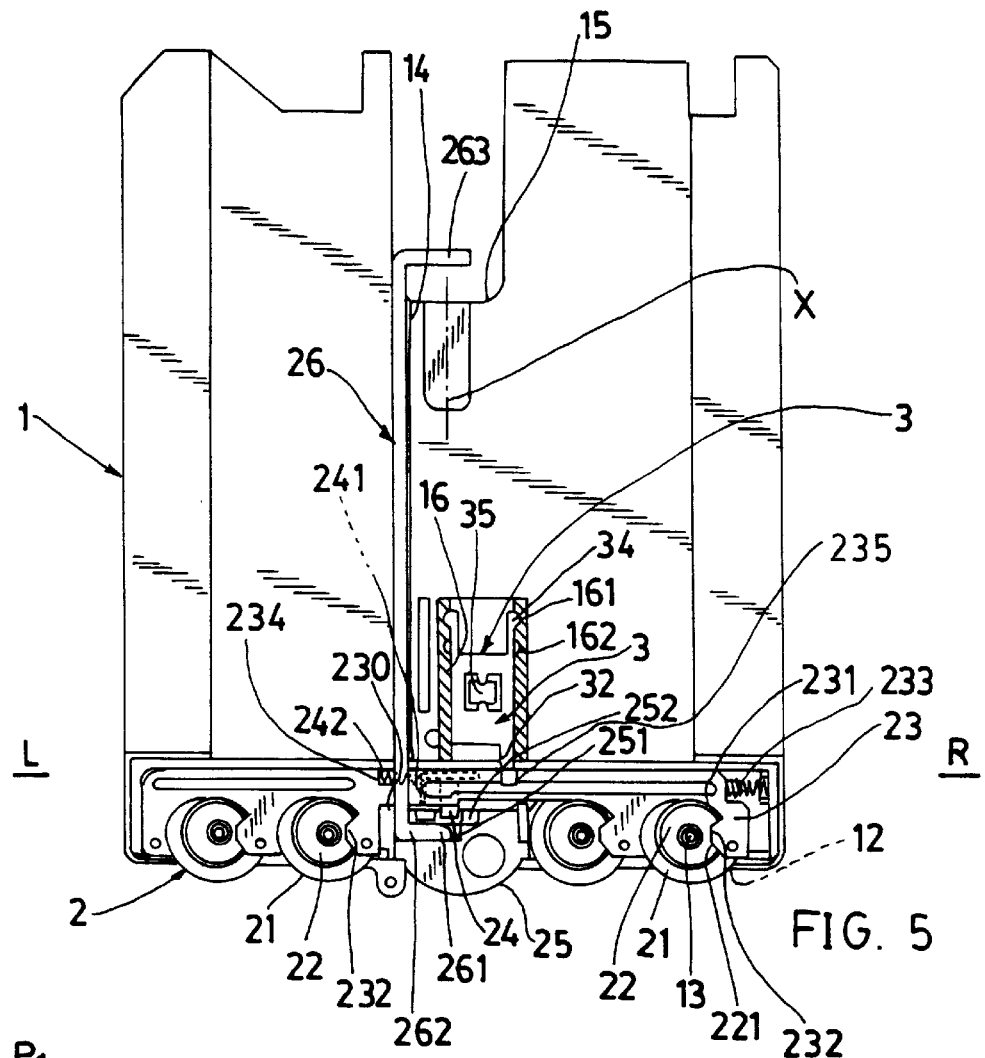
FIG. 5 is a bottom view illustration of the present invention when unlocked.

The combination locking device 2 includes: a plurality of dials 21 each dial 21 rotatably mounted on each stem 13 formed in the casing 11; a plurality of sleeves 22 each sleeve 22 resiliently engageable with each dial 21 with a tension spring 20 retained between the bottom cover 12 and the sleeve 22 and each sleeve 22 rotatably secured on each stem 13; a slide plate 23 slidably mounted in the casing 11 transverse to the longitudinal axis X having a plurality of sleeve slots 231 respectively recessed in the slide plate 23 each sleeve slot 231 engageable with each sleeve 22 within the sleeve slot 231, a restoring spring 233 normally tensioning the slide plate 23 from a first (or right) side R towards a second (or left) side L of the disk member 1 to allow a V-shaped cam portion 232 formed on a side portion of each sleeve slot 231 in the slide plate 23 to be engaged with each V-shaped notch 221 recessed in each sleeve 22 when the present invention is unlocked as shown in FIG. 5; a retarding lug 24 resiliently held in the slide plate 23 for retarding the depression of a push button 25 resiliently retained in the casing 11; and a locking bar 26 pivotally secured in the pivoting groove 14 of the disk member 1 and bias cranked in the push button 25 to be lockable within the disk drive D when the present invention is locked.

Each dial 21 has its arabic number displayed through each dial window 111 formed in the casing 11.

Figure 7:
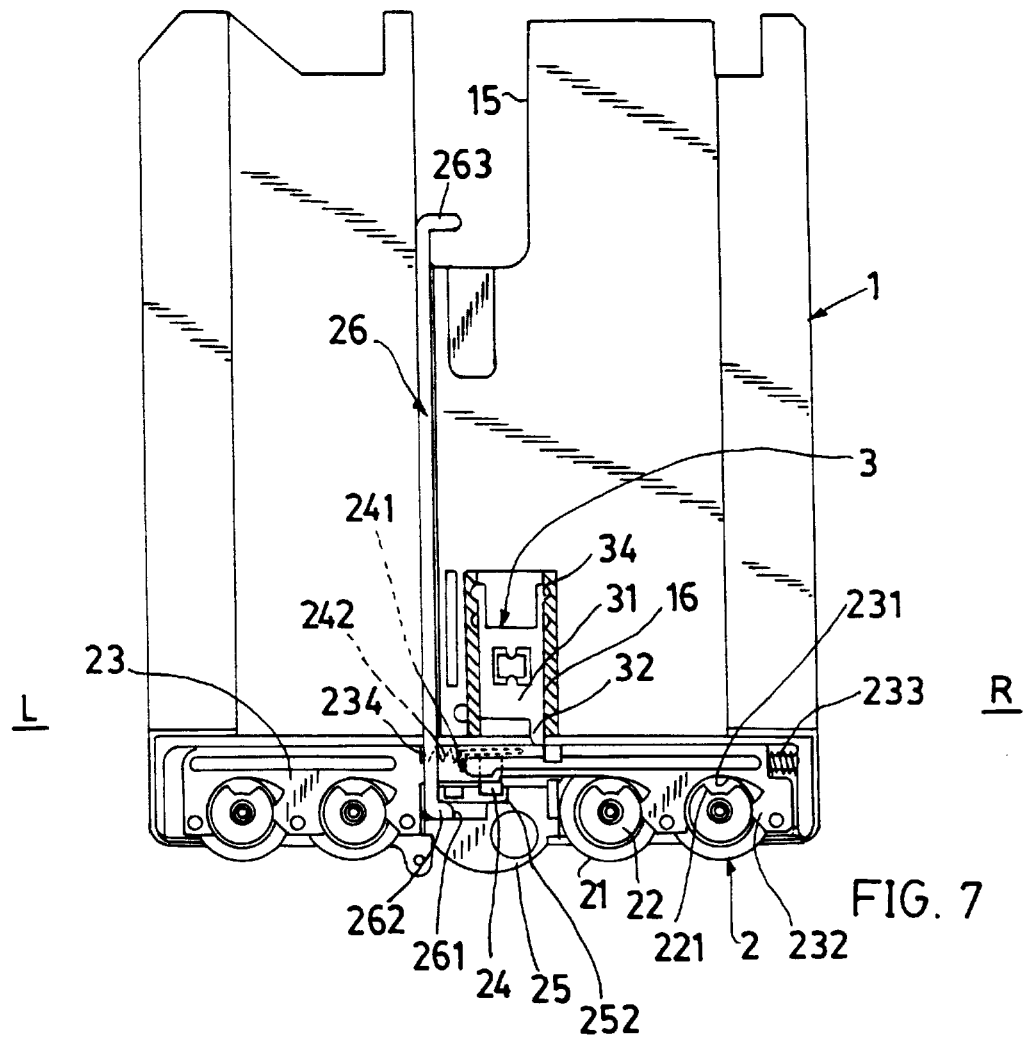
FIG. 7 is a bottom view illustration of the present invention when locked.
Figure 8:
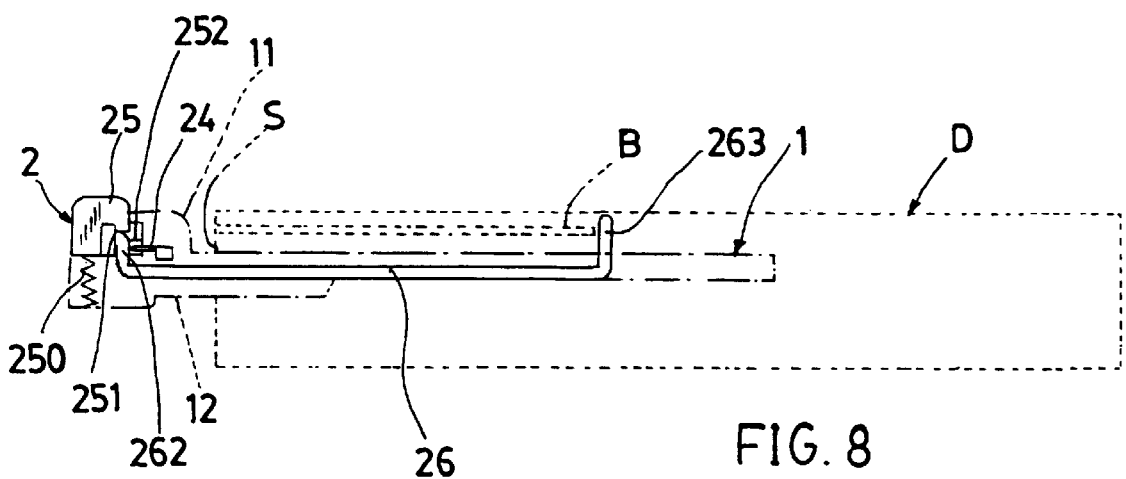
FIG. 8 is a side view illustration of the present invention when locked.

The push button 25 is resiliently formed in a button hole 112 formed in the casing 11 having a restoring spring 250 normally urging the push button upwardly to be ready for a depression (P) thereon when the lock means of the present invention is unlocked, having a socket 251 recessed in the button 25 for cranking the locking bar 25 in the socket 251 and a depression portion 252 formed in the button 25 and operatively engageable with the retarding lug 24 resiliently held in a lug recess 234 formed in the slide plate 23 when the present invention is locked (FIGS. 7, 8).

The retarding lug 24 has an end portion 241 held on a tension spring 242 retained in the lug recess 234 (FIGS. 2, 5, 7, 10).

Figure 3:
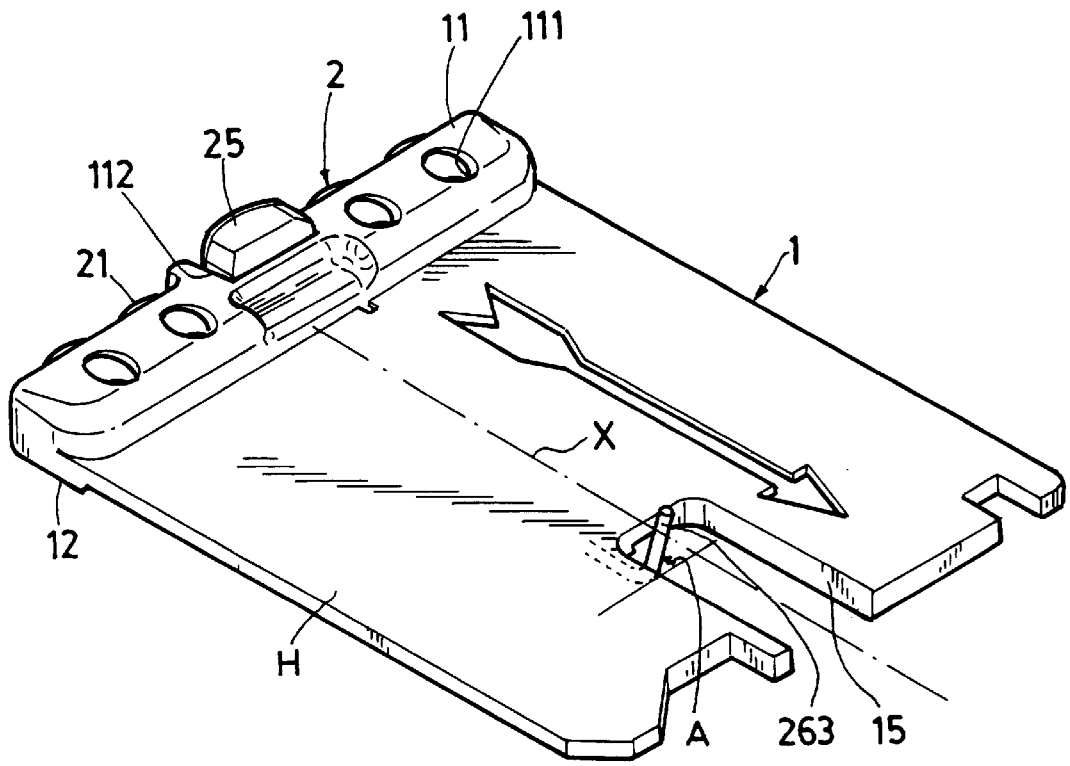
FIG. 3 is a perspective view of the present invention at a locked position.
Figure 12:
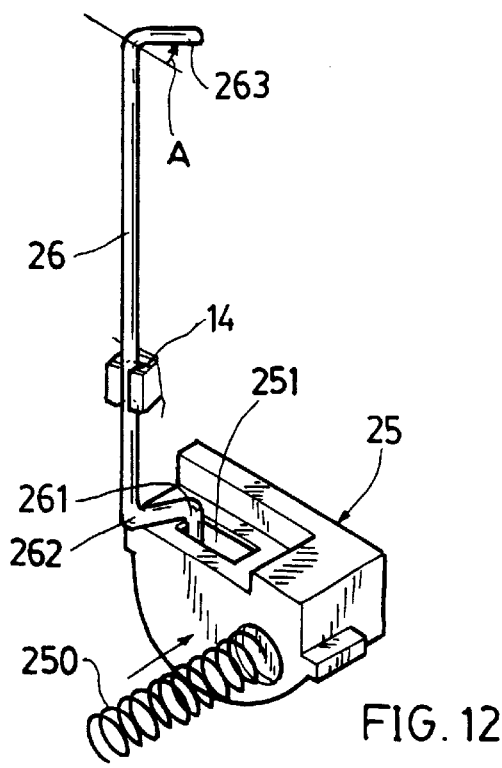
FIG. 12 shows a locked state when releasing the button from FIG. 11.

The locking bar 26 as pivotally secured in the groove 14 includes: a driving end portion 261 movably secured in the socket 251 in the push button 25, a crank arm portion 262 connected to the driving end portion 261 adjacent to a front (proximal) portion of the disk member 1 to be angularly biased as cranked by the push button 25 when resiliently restored by the restoring spring 250 (FIG. 12) when the present invention is locked upon releasing of the push button 25 (FIGS. 7, 8), and a hook end portion 263 formed at a rear (distal) end portion of the bar 26 to be simultaneously biased at an acute angle A (FIG. 3) with respect to the planar surface H of the disk member 1 corresponding to the crank arm portion 262 as biased when the present invention is locked, with the hook end portion 263 angularly biased to be obstructed by a baffle B (FIG. 8) formed in the disk drive D when locked.

Although the locking bar 26 of the present invention as illustrated is pivotally secured and angularly biased in the mechanism of the present invention. However, the locking bar 26 may also be modified (not shown) to be a locking bolt or latch straightly moved in and out to be locked in the disk drive, like a "door latch" of a door lock for locking a door, not limited in the present invention.

Figure 9:
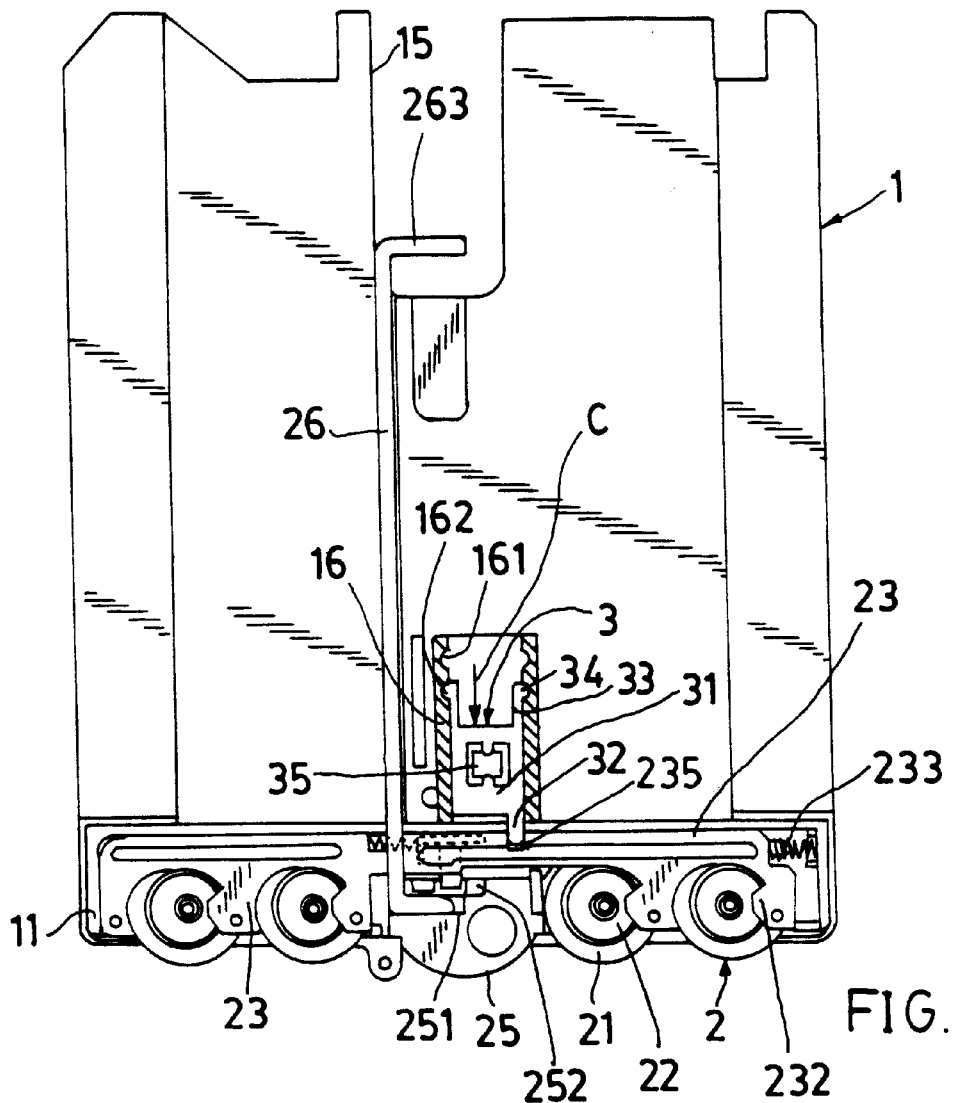
FIG. 9 is an illustration showing the combination-changing means of the present invention.

The combination-changing means 3 includes: a miniature plate 31 slidably held in a guiding groove 16 recessed in the disk member 1, a locking key 32 formed on a front end of the miniature plate 31 to be engaged with a key slot 235 notched in the slide plate 23 when the present invention is unlocked (FIG. 9), a pair of resilient leg members 33 respectively formed on a rear portion of the miniature plate 31, each leg member 33 having a protrusion 34 formed thereon to be engageable with a retracted recess 161 (FIG. 5) or to be engageable with a protruded recess 162 (FIG. 9) respectively recessed in the guiding groove 16, and a knob 35 formed on the miniature plate 31 for retracting the miniature plate 31 rearwardly or for protruding the miniature plate 31 forwardly ("C" as shown in FIG. 9) as movably guided in the guiding groove 16.

The bottom cover 12 further includes an extending cover 121 protruding rearwardly from the bottom cover 12 for shielding the miniature plate 31 of the combination-changing means 3 and a bottom slot 120 formed in the extending cover 121, allowing an outward protruding of the knob 35 and a movement of the knob 35 within the bottom slot 120 when retracting or extending the miniature plate 31.

Figure 4:
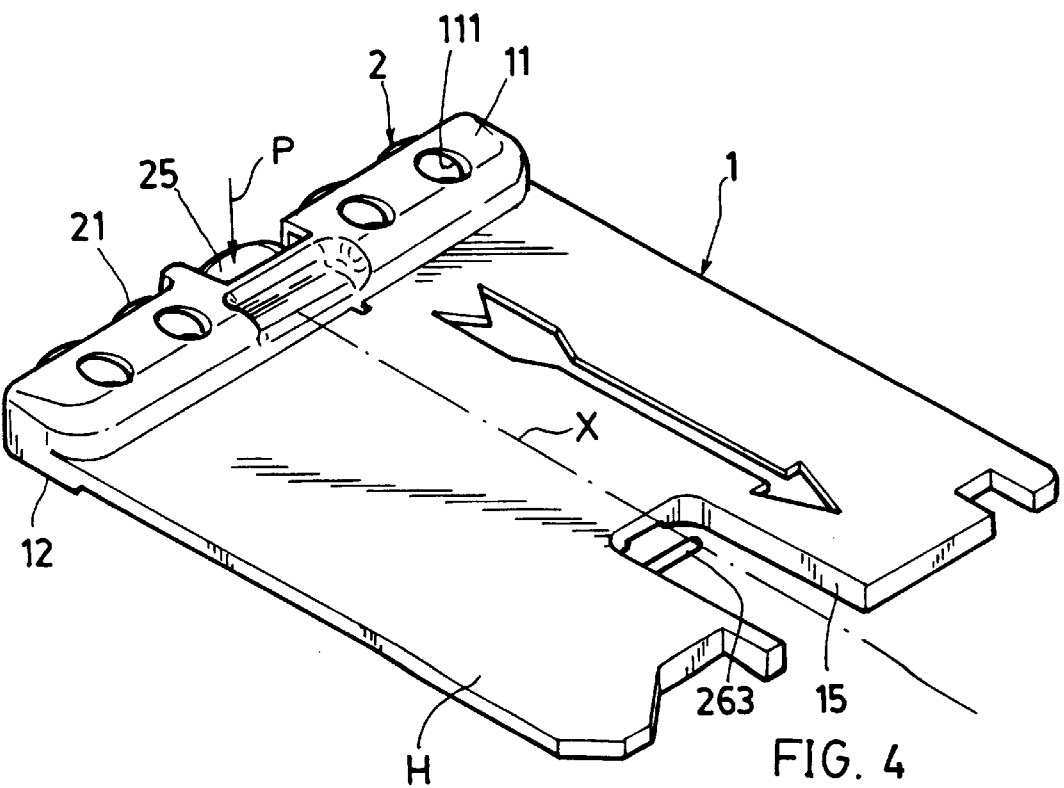
FIG. 4 is a perspective view of the present invention at an unlocked position.
Figure 11:
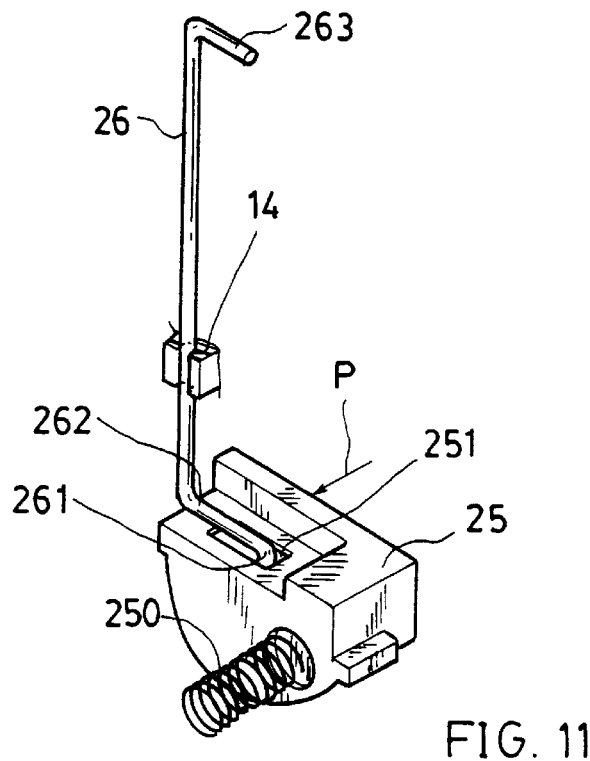
FIG. 11 shows an unlocked position when depressing the push button which is simplified for clear illustration.

When the combination locking device 2 is unlocked by rotating the dials to the correct combination and aligning (engaging) the V-shaped notch 221 in each sleeve 22 with each cam portion 232 formed on the slide plate 23 as shown in FIG. 5, the slide plate 23 is urged by the spring 233 from the right side R to the left side L to disengage the retarding lug 24 from the depression portion 252 of the push button 25; whereby upon a depression (P) of the push button 25 (FIG. 6), the crank arm portion 262 of the locking bar 26 will be downwardly depressed by the push button 25 (from FIG. 8 to FIG. 6; or from FIG. 12 to FIG. 11) to be horizontally flattened and the hook end portion 263 of the locking bar 26 will also be flattened (from FIG. 3 to FIG. 4) to be coplanar to the surface H of the disk member 1 to prevent from the obstruction by the baffle B in the disk drive D, allowing a withdrawal or removal of the disk member 1 from the disk drive D to thereby unlock the disk drive.

When it is intended to lock the disk drive by inserting the disk member 1 into the drive D, the dials are rotated to allow the V-shaped notch 221 of the sleeve 22 to thrust the cam portion 232 of the slide plate 23 to move the slide plate from the left side L to the right side R as shown in FIG. 7 to engage the depression portion 252 of the push button 25 with the retarding lug 24 to prevent a depression of the push button 25. The push button 25, when the depression (P) is released therefrom, will be restored upwardly (from FIG. 11 to FIG. 12) to crank the crank arm portion 262 upwardly to angularly bias the crank arm portion 262 and the hook end portion 263 of the locking bar 26 at an acute angle A as shown in FIGS. 3, 7, 8 and 12 to lock the disk member 1 against the baffle B in the disk drive D.

Figure 2:
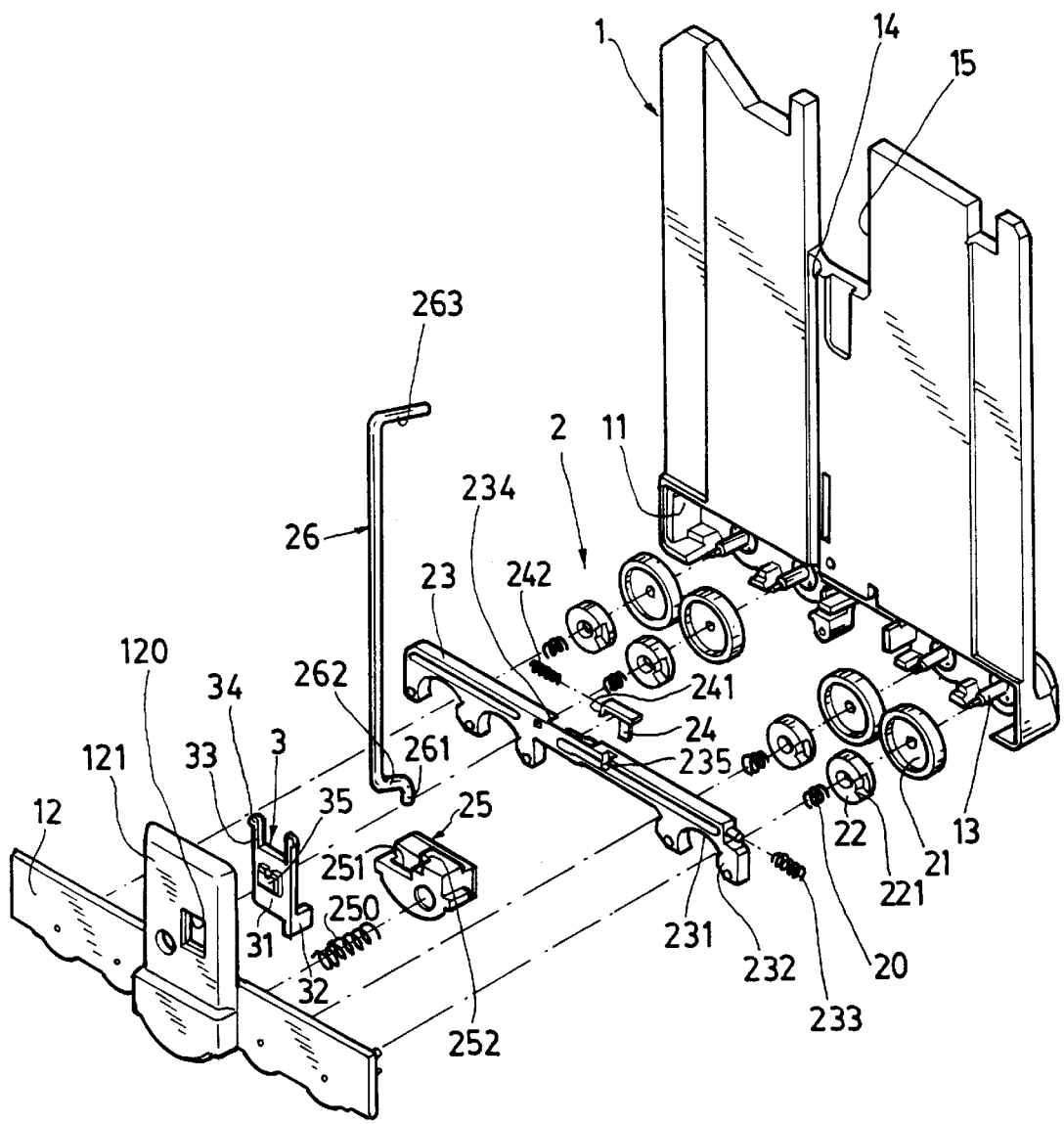
FIG. 2 is an exploded view of the elements of the present invention.

For resetting or changing the combination of the present invention as unlocked (FIG. 5), the miniature plate 31 of the combination-changing means 3 is extended forwardly (FIG. 9) to engage the locking key 32 with the key slot 235 in the slide plate 23 to lock the slide plate 23 and "brake" the rotation of sleeves 22 of which each notch 221 is engaged with each cam portion 232 of the slide plate 23. The dials 21 will then be free rotated to change their new combination. When extending the key and the miniature plate 31 (FIG. 9) to lock the slide plate 23, each protrusion 34 on the leg member 33 is removed from its retracted recess 161 (FIG. 5) to its protruded recess 162 (FIG. 9) by moving the knob 35 on the miniature plate 31 by using a small tool (not shown) inserted through a slot 120 formed in the cover 121 (FIG. 2).

Figure 6:
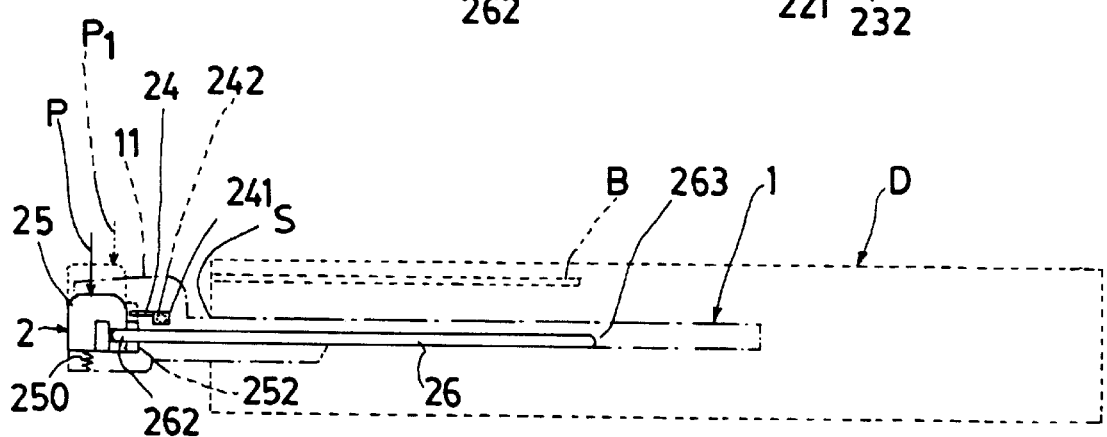
FIG. 6 is a side view illustration of the present invention when unlocked.
Figure 10:
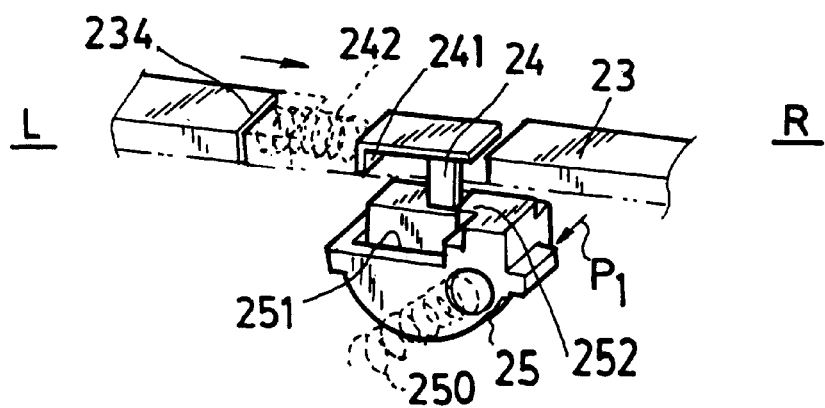
FIG. 10 is an illustration showing the lug resiliently held on the slide plate.

As shown in FIG. 10 and dotted line in FIG. 6, when the dials are rotated to thrust the slide plate 23 rightwardly and the push button 25 is depressed (P1) accidentally or unexpectedly during the unlocking of the present invention, the lug 24 resiliently held on the slide plate 23 may be retarded against a side portion of the push button 25. Nevertheless, the tension spring 242 retaining the lug 24 on the slide plate 23 may provide a "buffer" to allow the continuous rightward movement of the slide plate 23, without "locking" the sleeves 22, thereby allowing a simultaneous rotation of the dials 21 with the sleeves 22 in order for preventing unexpected variation of the combination and increasing the reliability of the present invention.

The present invention may be further modified without departing from the spirit and scope of the present invention.

I claim:

1. A combination lock means for disk drive comprising:
   a resembling disk member having a dimension generally corresponding to a dimension of a floppy disk insertable in an insert opening formed in a disk drive of a computer; and
   a combination locking device including a plurality of dials and sleeves and formed on said disk member operatively locking said disk member in the disk drive for preventing unexpected intrusion into the disk drive;
   whereby upon unlocking of said combination locking device to unlock said disk member, said disk member is withdrawn and removable from the disk drive for unlocking the disk drive;
   said disk member including: a flat plate corresponding to a floppy disk insertable in the insert opening in the disk drive having an upper and a bottom planar surface formed on said flat plate, a casing formed on a front end portion of the flat plate having a height of said casing larger than a height of the insert opening for inserting the flat plate into the disk drive, and a longitudinal axis defined at a longitudinal center of the disk member; said casing having said plurality of dials and sleeves of said combination locking device rotatably resiliently mounted therein.

2. A combination lock means according to claim 1, wherein said combination locking device further includes: a slide plate slidably resiliently mounted in said casing transverse to the longitudinal axis of said disk member having a plurality of V-shaped cam portions juxtapositionally formed on said slide plate with each cam portion engageable with each V-shaped notch recessed in each said sleeve when said combination locking device is unlocked, a retarding lug resiliently retained in said slide plate by a tension spring, a push button resiliently mounted in said casing and operatively obstructed, when downwardly depressed, by said retarding lug on said slide plate when said locking device is locked, and a locking bar pivotally secured on said disk member and bias cranked in the push button and lockable within said insert opening in said disk drive for locking said disk member in said disk drive when said locking device is locked.

3. A combination lock means according to claim 2, wherein said push button is resiliently formed in a button hole formed in the casing having a restoring spring normally urging the push button upwardly to be ready for a depression thereon when the locking device is unlocked, having a socket recessed in the button for cranking the locking bar in the socket and a depression portion formed in the button and operatively engageable with the retarding lug resiliently held in a lug recess formed in the slide plate when the locking device is locked.

4. A combination lock means according to claim 2, wherein said locking bar includes: a driving end portion movably secured in a socket formed in the push button, a crank arm portion connected to the driving end portion adjacent to a front portion of the disk member and operatively angularly biased as upwardly cranked by the push button when the locking device is locked, and a hook end portion formed at a rear end portion of the bar and operatively biased at an acute angle with respect to a planar surface of the disk member simultaneously corresponding to the crank arm portion which is angularly biased when the locking device is locked, with the hook end portion operatively angularly biased to be obstructed by a baffle formed in the disk drive for locking said disk member in said disk drive.

5. A combination lock means according to claim 2, wherein said combination locking device further includes a combination-changing means formed in said casing, having a cover formed on a bottom of said casing for shielding said combination-changing means in said casing.

6. A combination lock means according to claim 5, wherein said combination-changing means includes: a miniature plate slidably held in a guiding groove recessed in the disk member, a locking key formed on a front end of the miniature plate to be engaged with a key slot notched in the slide plate when the locking device is unlocked, a pair of resilient leg members respectively formed on a rear portion of the miniature plate, each said leg member having a protrusion formed thereon to be selectively engageable with a retracted recess and a protruded recess respectively recessed in the guiding groove, and a knob formed on the miniature plate for retracting the miniature plate rearwardly or for protruding the miniature plate forwardly as movably guided in the guiding groove; with said knob movably protruded into a slot formed in said cover of said casing.

\* \* \* \* \*